United States Patent
Kaye et al.

(10) Patent No.: US 12,530,184 B2
(45) Date of Patent: Jan. 20, 2026

(54) SELECTIVE FIRMWARE UPDATES FOR DENTAL EQUIPMENT

(71) Applicant: A-DEC, INC., Newberg, OR (US)

(72) Inventors: John Edward Kaye, Newberg, OR (US); Jessica Kaye McMullan, Newberg, OR (US); Spenser Bray, Newberg, OR (US); Brent Haven Daniels-Soles, Stanley, NC (US); Ryan Michael Williams, Sherwood, OR (US); Lee An, West Linn, OR (US); Geoffrey Schuyler Goodman, Tualatin, OR (US); Randy Lathrop, Mount Angel, OR (US)

(73) Assignee: A-DEC, INC., Newberg, OR (US)

( * ) Notice: Subject to any disclaimer, the term of this patent is extended or adjusted under 35 U.S.C. 154(b) by 0 days.

(21) Appl. No.: 18/183,021

(22) Filed: Mar. 13, 2023

(65) Prior Publication Data
US 2024/0311123 A1    Sep. 19, 2024

(51) Int. Cl.
*G06F 8/65*    (2018.01)
*G06F 8/71*    (2018.01)
*H04L 67/12*    (2022.01)

(52) U.S. Cl.
CPC .................. *G06F 8/65* (2013.01); *G06F 8/71* (2013.01); *H04L 67/12* (2013.01)

(58) Field of Classification Search
CPC .............. G06F 8/65; G06F 8/71; H04L 67/12
See application file for complete search history.

(56) References Cited

U.S. PATENT DOCUMENTS

| | | | | |
|---|---|---|---|---|
| 2010/0124732 | A1* | 5/2010 | Ariff | A61C 19/043 382/128 |
| 2015/0074658 | A1* | 3/2015 | Gourlay | F24F 11/58 717/172 |
| 2015/0112829 | A1* | 4/2015 | Jaroker | H04L 67/34 705/26.5 |
| 2016/0004820 | A1* | 1/2016 | Moore | G16H 15/00 705/3 |
| 2016/0085533 | A1* | 3/2016 | Jayanti Venkata | H04L 41/28 717/175 |
| 2016/0294605 | A1* | 10/2016 | Searle | H04L 41/069 |
| 2017/0039372 | A1* | 2/2017 | Koval | H04L 67/06 |

(Continued)

FOREIGN PATENT DOCUMENTS

IT    201800003352 U1 *    3/2020    ............. G16H 40/67

OTHER PUBLICATIONS

United States International Searching Authority, International Search Report and Written Opinion of the International Searching Authority in PCT/US2024/019165, mailed Jun. 17, 2024, 9 pages.

*Primary Examiner* — Lewis A Bullock, Jr.
*Assistant Examiner* — Theodore E Hebert
(74) *Attorney, Agent, or Firm* — Schwabe, Williamson & Wyatt, P.C.

(57) ABSTRACT

Dental operatories with a plurality of networked devices may only require firmware updates for a subset of the devices. In embodiments, the plurality of networked devices are queried to determine a current firmware revision for each device. An update service then builds an update package that only includes firmware update images for those devices determined to have out of date firmware, thereby saving time and network bandwidth. Other embodiments may be described and/or claimed.

20 Claims, 6 Drawing Sheets

(56) References Cited

U.S. PATENT DOCUMENTS

| | | | |
|---|---|---|---|
| 2018/0060065 A1* | 3/2018 | Lai | G06F 8/71 |
| 2020/0012488 A1* | 1/2020 | Koval | G06F 8/71 |
| 2021/0173727 A1* | 6/2021 | Rusev | G06F 8/65 |

* cited by examiner

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 6

SELECTIVE FIRMWARE UPDATES FOR DENTAL EQUIPMENT

TECHNICAL FIELD

Disclosed embodiments are directed to firmware updating of hardware devices, and specifically to providing selective firmware update packages for devices networked in a dental operatory.

BACKGROUND

Dental clinics use a variety of specialized equipment, necessary to the dentistry profession. Equipment may include adjustable chairs, dental lights, sterilizers, a variety of dental implements such as rotary handpieces, ultrasonic scalers, lasers, intraoral cameras, digital scanners, suction instruments, and cuspidors, and supporting mechanical equipment such as dental units, vacuum pumps, compressors and air purifiers. These various pieces of equipment may include both mechanical components and electronic components, which may be used to control and coordinate function of the various components and other dental equipment. Increasingly, electronic components include one or more central processors, such as microcontrollers, that execute software.

As is typical with systems that are controlled by a combination of hardware and software, the software—in the context of a microcontroller, typically a form of firmware—may require updating on a periodic basis. Updates may provide fixes to identified bugs, improvements in functionality, expanded capabilities, and enhance compatibility. The manufacturer of a given piece of equipment is usually responsible for developing and distributing firmware updates. Depending upon the implementation of a given piece of hardware, the firmware updates may comprise a binary image file that is written to non-volatile memory associated with a microcontroller or central processor.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6 is a block diagram of a computer-readable storage medium that can be used to implement some of the components of the system or methods disclosed herein, according to various embodiments.

DETAILED DESCRIPTION

Figure 1:
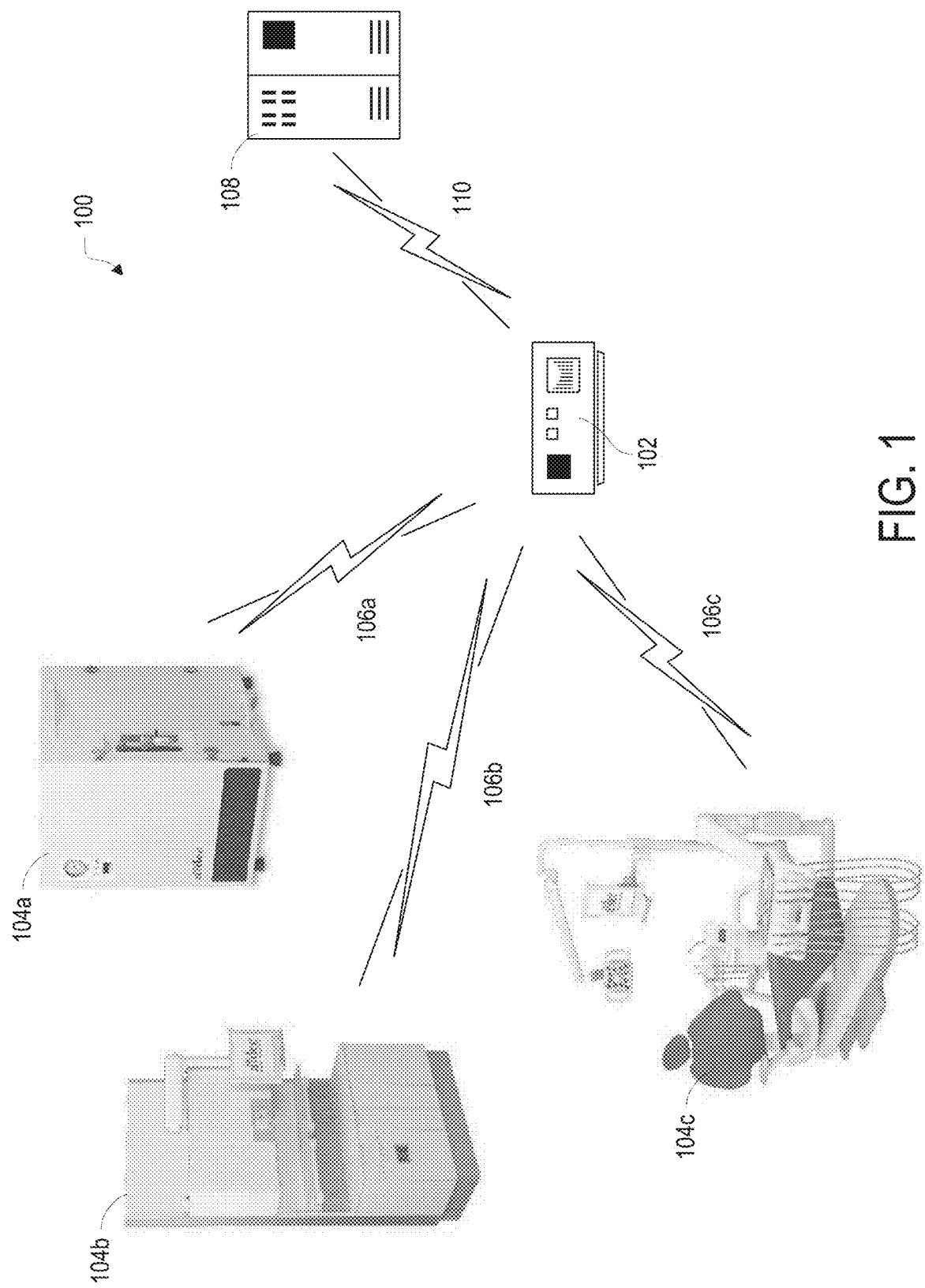
FIG. 1 illustrates an example networked system that includes a dental operatory with updatable hardware, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In some figures, multiples of a same or similar type of element may be designated with a, b, c, etc., such as 100*a*, 100*b*, 100*c*. Such elements may be collectively or generically referred to by just the call-out number, e.g. 100, with a letter added when a specific one of the element is intended.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various devices in a modern dental clinic may be controlled by microcontrollers or similar processors that execute software. Such software, when intended for a dedicated piece of hardware, may be considered firmware, as it frequently is written to a non-volatile memory associated with a microcontroller. As with any type of software, firmware may be updated on a periodic basis for various reasons, such as bug fixes, security patches, improvements to functionality, etc. As microcontroller circuits are typically designed to work with a specific piece of hardware as opposed to a general purpose computer, the firmware is likewise specifically written for a specific hardware environment. Thus, a given firmware is tied to its hardware environment, in contrast to a general purpose operating system that may run on an array of different hardware environments by loading appropriate device drivers.

Because of the typical close integration between a microcontroller and its hardware environment, firmware images are often unique to a given device. A dental clinic may have dozens of different devices with microcontrollers that may require updating. Processes for updating have varied; some existing processes require going to each device individually and manually updating the firmware. Obviating this hassle, modern equipment increasingly supports online or network updating, where a firmware image is pushed to a device over a network, allowing the device to be updated remotely. The firmware images may be transferred to a dental clinic over a network from a remote update service.

Firmware updates for various devices may be developed and released at different intervals. It is unlikely that, for a given clinic, firmware images for all devices will be updated simultaneously. Furthermore, devices may not be timely updated each time a firmware update is released for various reasons, such as when a piece of hardware needs to be replaced, with the replacement being shipped prior to release of a more current firmware. As a result, some devices in a clinic may have a current firmware, while other devices may be in need of an update. Thus, an update service, which may have an inventory list of devices for a given clinic, may not know which devices actually need an update. An update service accordingly may generate a file that includes firmware images for all devices in a clinic, regardless of whether a given device actually needs to be updated. For clinics with significant numbers of devices, the image size for an update package may become significant, with downloads consuming significant amounts of time and network bandwidth. Similarly, where an update service provides images for a relatively large number of clinics, the update service may require significant network bandwidth.

Disclosed embodiments include systems and methods for providing selective updates for devices in a dental operatory. By first querying the devices in an operatory for each device's present firmware revision, the firmware revisions can be used to determine which devices are out of date. Once determined, an update service can build an update package that includes only the firmware images for those devices determined to be out of date. This can result in savings in network bandwidth and download time, as well as ease the burden on the operatory equipment in not having to deal with an excessively large update image. Other possible variations and embodiments will be disclosed below.

For purposes of this disclosure, "dental operatory" is a communicative rather than physical association and should be understood to mean any number of devices that are in network connection to a given gateway, as discussed below, regardless of whether a given device is actually within a physical dental operatory. Devices may be located within a physical room, such as a dental treatment room, and/or may be located in another physical area or room, such as a mechanical room, cleaning/sterilization area, etc. The gateway may be located in the same or a different physical location from some or all of its associated devices. In some embodiments, a single room (such as a server room) may house multiple gateways, such as some or all gateways for a given dental clinic. In other embodiments, a gateway may be connected to devices that are located in disparate physical locations, such as different dental clinics. In still other embodiments, a dental operatory may be equipped with multiple gateways. Where multiple gateways are connected to the same collection of devices, they may jointly coordinate firmware updates in any suitable fashion, e.g. a subset of the devices may be assigned to each gateway, or each gateway may be capable of updating all devices, with whichever device contacts an update service first handling updates, etc.

FIG. 1 illustrates an example system 100 that supports selective updates from an update service to various devices in a dental operatory. In the depicted embodiment, system 100 includes a gateway 102 that acts as an intermediary between various dental equipment devices 104a, 104b, and 104c (generically, device 104) and an update service 108.

Gateway 102, in embodiments, acts as a central point of communication between the dental equipment devices 104 and update service 108. The various devices 104, as can be seen in FIG. 1, are in communication with gateway 102. Gateway 102 may serve as a bridge, translating and processing data from external sources, such as update service 108, and from internal sources such as devices 104. In embodiments, gateway 102 is responsible for pushing firmware update images received from update service 108 to each of the devices 104. Gateway 102 may also act on behalf of update service 108, coordinating answers to queries that may be received from update service 108. In some embodiments, gateway 102 may determine which of the devices 104 is in need of a firmware update, as will be discussed below in greater detail with respect to FIG. 4.

Gateway 102 may be implemented as a type of computer device 1500 (FIG. 5), running specialized software, as dedicated hardware, or as a combination of both. While depicted as a single unit, in other embodiments gateway 102 may be implemented as several components, which may include cloud services or middleware connected via data link 110. In some embodiments, gateway 102 may be integrated as part of one of the devices 104. For example, dental chair 104c may include a control interface, with the control or user interface also providing the functionality of and acting as gateway 102. In other embodiments, the functionality of gateway 102 may be provided by an interface board in one of the devices 104.

In addition to firmware updates, gateway 102 may further perform data collection from the various devices 104, such as obtaining performance metrics, diagnostics, system status, error codes, statistical data, etc., and providing such data to a remote service for subsequent digestion and dissemination. The remote service may aggregate information from a number of different gateways 102, which may be under common control. For example, a dental practice may have multiple clinics spread across a particular geographic location or locations. The various gateways 102 may collect data from their respective connected devices 104, and provide this information to the remote service, which can then provide visibility into the information to users such as an administrator of the practice, administrator of a given location, etc.

As mentioned above, the various devices 104 may be located within a given physical dental operatory or other location within a dental clinic or other dental treatment facility, or may be common to multiple operatories. In the depicted embodiment, device 104a may be a machine located in a mechanical room, such as a vacuum pump or compressor that is shared among multiple physical operatories. Device 104*b* may be a remote work station that is connected to a single physical operatory or multiple physical operatories. Device 104*c* may be a dental chair, forming the basis of a given physical operatory. Still further, some devices 104 may be attached to the dental chair, device 104*c*. For example, the dental chair may be equipped with a dental unit, various powered dental instruments, a dental light, a cuspidor, etc., which each could be implemented with a microcontroller that accepts firmware updates. The dental unit, powered dental instruments, dental light, cuspidor, etc. may each be considered a device 104. Other embodiments may have different and fewer or more devices 104. Still further, in some embodiments, a given device 104 may be in communication with multiple gateways 102. In some embodiments, a given gateway 102 may be connected to some devices, in addition to devices 104, that do not support firmware updates by the gateway 102, e.g. they either are not upgradeable, do not use firmware, and/or require a manual or physical update process (such as using a USB stick or other physically attached storage). Devices 104 should be understood to refer to only those devices connected to gateway 102 that support a firmware update by gateway 102.

As seen in FIG. 1, a data link 106*a*, 106*b*, and 106*c* (generically, data link 106) may be established between each device 104, as well as gateway 102. In embodiments, the data links 106 may provide bi-directional (two-way) communication with gateway 102. Each respective data link 106 may be used to exchange information with gateway 102, such as indications of device identity, device firmware revision, as well as transfer of firmware images. Data links 106 may be implemented over any suitable network technology. In some embodiments, data links 106 are established over a CAN bus, which links each of the devices 104 with gateway 102 and/or each other. It should be understood that FIG. 1 is logical in nature and not intended to depict an actual topology or network configuration. In this respect, data links 106 are illustrated logically as point to point for data exchange. The actual topology and interconnections between devices 104 and gateway 102 may vary depending upon the needs of a given implementation.

With respect to gateway 102, data link 110 may be used to exchange information with update service 108, including the aforementioned device identities, firmware revisions, and a selective firmware image. It should be understood that, in embodiments, each data link 106 and/or 110 may be transitory, being established and used only when necessary, and being disconnected when dormant; in other embodiments, one or more data links 106 and/or 110 may be continually established. In some embodiments, data link 110 may be a local area network, a wide area network, and/or the Internet, with update service 108 accessible over the Internet.

Update service 108 may be implemented on a remotely located server or cluster of servers, or may be implemented as part or all of a data center or Internet-accessible cloud service. As will be discussed herein, in embodiments update service 108 may determine which devices 104 in an operatory require firmware updates and build selective update packages, as will be discussed below with respect to FIG. 3. In embodiments, update service 108 may be owned and/or operated by the manufacturer of the dental equipment in the operatory. It further should be understood that although system 100 is illustrated as only having a single update service 108, system 100 may include multiple different update services, such as where devices 104 are provided by different manufacturers, distributors or other parties.

Figure 2:
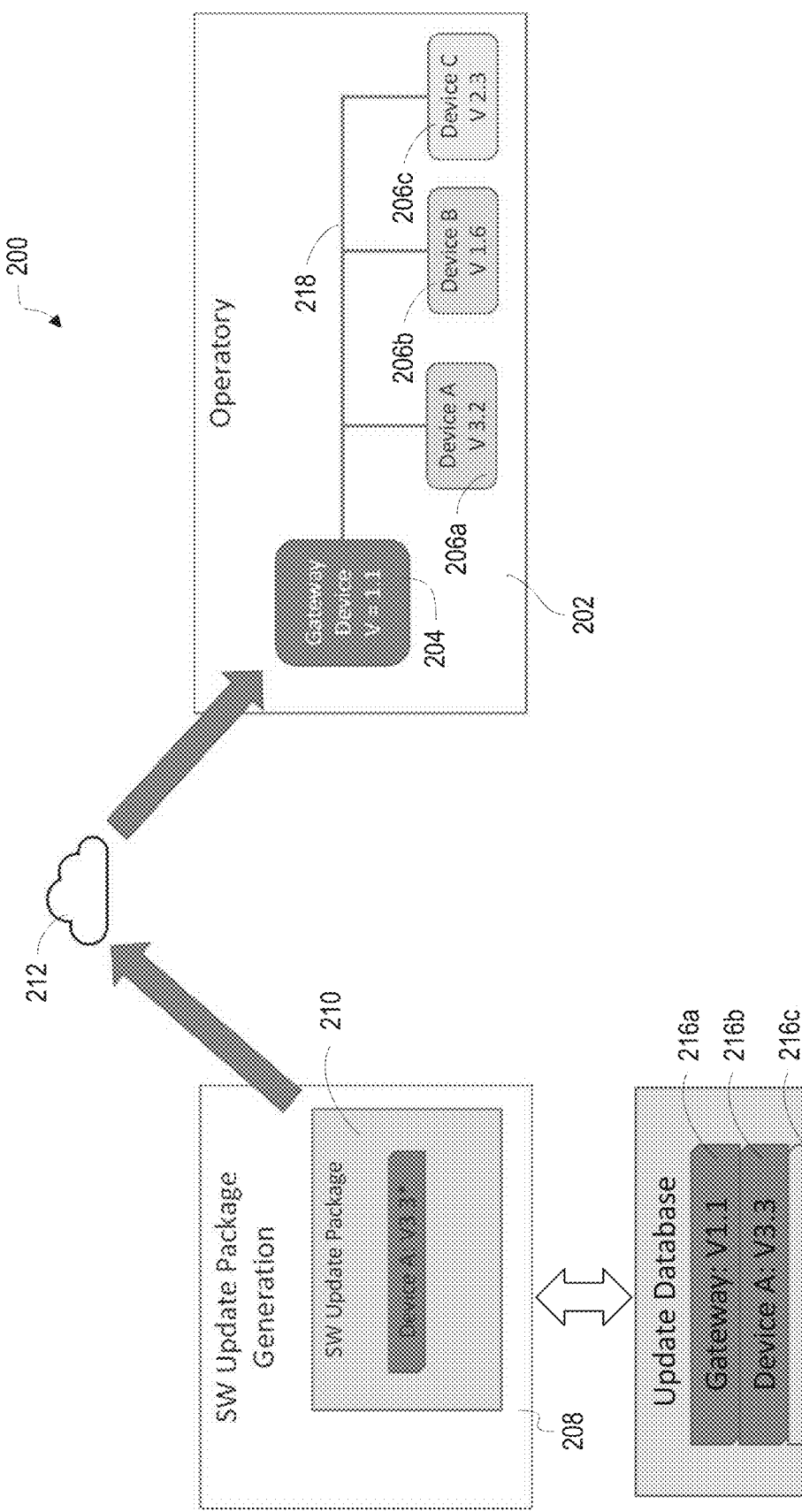
FIG. 2 is a process flow for selectively updating the firmware of hardware associated with a dental operatory, according to various embodiments.

FIG. 2 illustrates the process flow 200 for providing selective firmware update images to an operatory. Process flow 200 may be carried out as part of interactions between an update service, a gateway, and operatory devices, such as gateway 102, devices 104, and update service 108 of FIG. 1, above.

In process flow 200, an operatory 202 includes a gateway 204, which is in communication with devices 206*a*, 206*b*, and 206*c* over a local network 218. As discussed above with respect to FIG. 1, local network 218 may be a CAN bus or other technology that is suitable for a given embodiment. Operatory 202 is in communication with an update service 208 via a network 212. Network 212 may be a local area network, a wide area network, the Internet, or a combination of the foregoing. Network 212 allows gateway 204 in operatory 202 to receive an update package 210 from update service 208. The update service 208 may include an update database 214, which may hold firmware update images along with information about the current firmware revision for some or all devices for which update service 208 provides firmware updates. It should further be understood that update database 214 may, in some embodiments, be located remote from update service 208, which may access update database 214 over a wide-area network, such as the Internet or a private network. In some such embodiments, update database 214 may be provided as an Internet-accessible cloud service or as a remotely accessible service hosted by a third party.

In operation, update service 208 may query the gateway 204 for a list of firmware revisions for each of the devices 206 in the operatory 202, in some embodiments. As can be seen, gateway 204 has a firmware revision of 1.1; device 206*a* has a firmware revision of 3.2, device 206*b* has a firmware revision of 1.6; and device 206*c* has a firmware revision of 2.3. These revision numbers may be provided to update service 208 by gateway 204 over network 212. In other embodiments, update server 208 may also or alternatively query the gateway 204 to determine is a particular or specific type or model of device 206 which may be of interest is attached, e.g. if a critical firmware update is made available for a particular model or type of device, and it is desirable to push the update out as quickly as possible, to name one possible scenario. For example, the update server 208 may query gateway 204 to determine if a compressor is connected to gateway 204, if a particular model of dental chair is connected to gateway 204, or some combination of types/makes/models.

Once received, update service 208 may consult the update database 214. As shown in FIG. 2, update database 214 includes a firmware revision 216*a* for gateway 204 of 1.1; a firmware revision 216*b* for device 206*a* of 3.3; a firmware revision 216*c* for device 206*b* of 1.6; and a firmware revision 216*d* for device 206*c* of 2.3. As can be seen, only device 206*a* is out of date. Device 206*a* has a firmware revision of 3.2, while the corresponding current firmware revision 216*b* is 3.3. Consequently, update service 208 prepares a firmware update package 210 that only contains the firmware revision 216*b*, as all other devices 206*a*, 206*c*, and gateway 204 have the most up-to-date firmware revision. The update service 208 accordingly transmits the update package 210 to the operatory 202 for installation via gateway 204.

Figure 3:
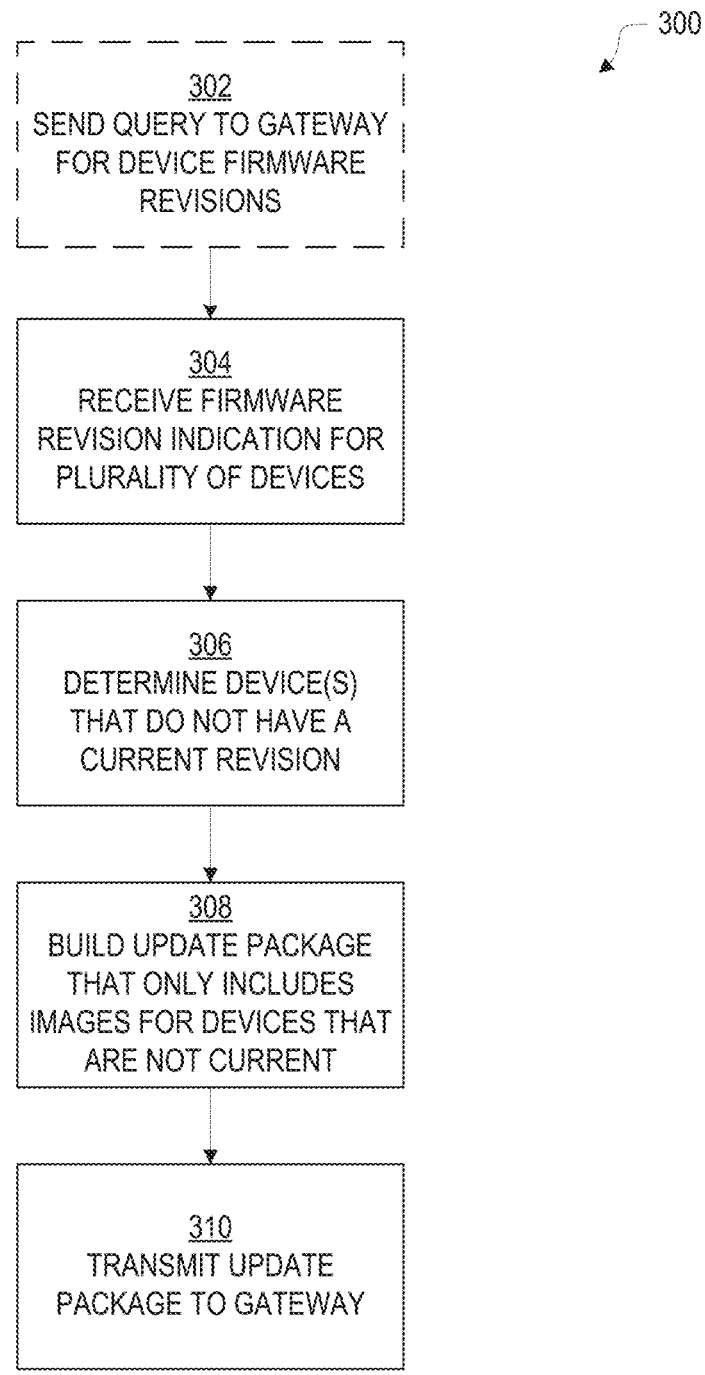
FIG. 3 is a flowchart of operations of an example method that may be executed by an update service to provide a selective firmware update image, according to various embodiments.

In FIG. 3, the operations of an example method 300 that may be carried out by an update service, such as update service 108 (FIG. 1) or update service 208 (FIG. 2), according to various embodiments. Method 300, in some embodiments, may be implemented on a system such as system 100.

In embodiments, some portions of method 300 may be carried out by update service 108, with other portions of method 300 may be carried out by other components of system 100, such as gateway 102. The various operations of method 300 may be carried out in whole or in part, and may be carried out in a different order than as depicted, depending upon the needs of a given implementation. Depending on the specifics of a given embodiment, some operations may be omitted (even if not explicitly indicated as such) or modified, and/or additional operations may be added.

In operation 302, the update service sends a query to a gateway, such as gateway 102 (FIG. 1) or gateway 202 (FIG. 2), to obtain a list of the firmware revisions installed on each device, such as devices 104 (FIG. 1), that are in network communication with the gateway. The query may be of any suitable format to signal the gateway. Operation 302 is illustrated in dashed lines as it may not necessarily be carried out; in some embodiments, the gateway may periodically automatically send the list of firmware revisions to the update service without needing an initial query from the update service. In other embodiments, the query may also include a request to identify each of the devices, e.g., a model number, such as when the firmware revision does not uniquely identify the type or model of a device, or the update service does not have a list of the particular devices installed at the operatory associated with the gateway. In still other embodiments, the update service may send a query to a gateway to identify if one or more specific device type(s) or model(s) of a device is installed at the operatory, and if so, obtain the firmware revision(s) of the device(s).

In operation 304, the list of firmware revisions is received by the update service from the gateway. In some embodiments, the list may include the firmware revisions for all devices attached to the gateway. In other embodiments, such as where the gateway is able to determine which devices have out of date firmware revisions, the list may be only of those devices that require a firmware image for updating.

In operation 306, in some embodiments, the update service determines which devices have out of date firmware revisions. The update service may consult a database that lists the current firmware revisions for all devices. In some embodiments, the database may be accessed using device identifiers as lookups, with the resulting firmware revision compared to the firmware revision received from the gateway. In other embodiments, the update service may have a previously stored list of all devices associated with the gateway, and can use the list to determine the current firmware revisions and compare to the list received from the gateway. As mentioned above, in other embodiments, operation 306 may be at least partly carried out by the gateway.

In operation 308, once the devices that have out of date firmware revisions are identified, the update service builds an update package that only contains firmware images for the devices that are out of date, if any are determined to be out of date. Devices that are current do not have images included within the update package. The package may be of any suitable format that allows for transmission within available bandwidth and that can be used by the gateway to extract the firmware images. The firmware images, in embodiments, are in a format appropriate for their intended devices. Once the update package is built, in some embodiments it is transmitted to the operatory gateway in operation 310, to be installed on the relevant devices. In other embodiments, the gateway may be provided a resource locator (such as a URI) by the update service, with the gateway then downloading the update package from the source indicated by the resource locator.

Figure 4:
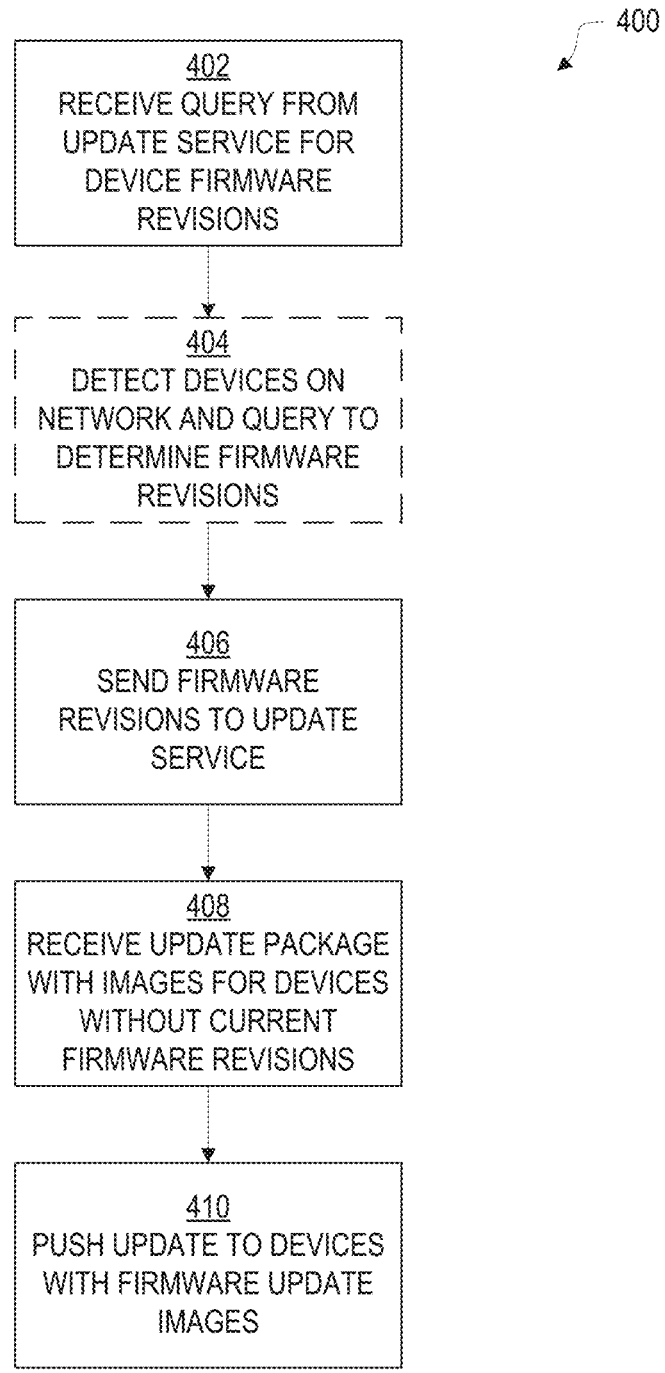
FIG. 4 is a flowchart of operations of an example method that may be executed by a gateway in communication with an update service to provide a selective firmware update image, according to various embodiments.

In FIG. 4, the operations of an example method 400 that may be carried out by a gateway, such as gateway 102 (FIG. 1) or gateway 202 (FIG. 2), according to various embodiments. Method 400, in some embodiments, may be implemented on a system such as system 100. For example, some portions of method 400 may be carried out by components of system 100, such as update service 108 and/or gateway 102, depending upon the specifics of a given implementation. The various operations of method 400 may be carried out in whole or in part, and may be carried out in a different order than as depicted, depending upon the needs of a given implementation. Depending on the specifics of a given embodiment, some operations may be omitted (even if not explicitly indicated as such) or modified, and/or additional operations may be added.

In operation 402, the gateway receives a query from an update service, such as update service 108 or 208, requesting a list of firmware revisions for some or all devices connected to the gateway. How the query is structured will depend upon the specifics of a given implementation. In some embodiments, the gateway may simply repeat or broadcast the request from the update service across the network to all devices, and then relay the responses to the update service. As mentioned above with respect to method 300, in some embodiments the query may also include a request for device identifiers, such as to determine device models. Furthermore, in some embodiments operation 402 may be omitted, such as where the gateway initiates an update request; the gateway may simply send the list of firmware revisions without first receiving a query from the update service. In other embodiments, a middleware service or application may coordinate requests between the gateway and the update service, including receiving update requests from the gateway, receiving update packages from the update service, and providing the update package or package location to the gateway. In still other embodiments, a user such as a staff member or administrator for the dental clinic may manually initiate or request the gateway to commence a device firmware request and update.

In operation 404, the gateway may detect devices attached to it via a network, and proceed to query each device to determine its firmware revision. Operation 404 is rendered in dashed line because, depending on the embodiment, it may be unnecessary. In some embodiments, the gateway may already be aware of all devices attached to the network, or may query to determine whether any devices have been added or removed. The query may also request each device to provide an identifier indicating its model, serial number, and/or any other pertinent identifying information, if such information is needed and/or the gateway has not stored such information. The query to determine firmware revisions may be made in response to receiving a query from the update service in operation 402, or may be done on a scheduled basis or ad hoc basis without first receiving a query from the update service.

In operation 406, the gateway sends the list of firmware revisions to the update service. In some embodiments, the entire list of firmware revisions for all devices may be transmitted to the update service. In other embodiments, the gateway may have access to a list of current firmware revisions, either stored locally to the gateway or available through a remote server such as the update service. If so, the gateway may be able to compare the firmware revisions from each device with the list of current firmware revisions, and determine which devices are out of date. The gateway may then transmit a list of only those devices that are out of date to the update service.

In operation 408, the gateway receives an update package from the update service that contains only those firmware update images for devices that have out of date firmware revisions. Once received, in operation 410, the gateway pushes the update images to those devices that are out of date. The mechanics of how the gateway updates each out of date device will depend on the specifics of a given implementation, including the capabilities of the gateway and how a particular device must be updated.

Figure 5:
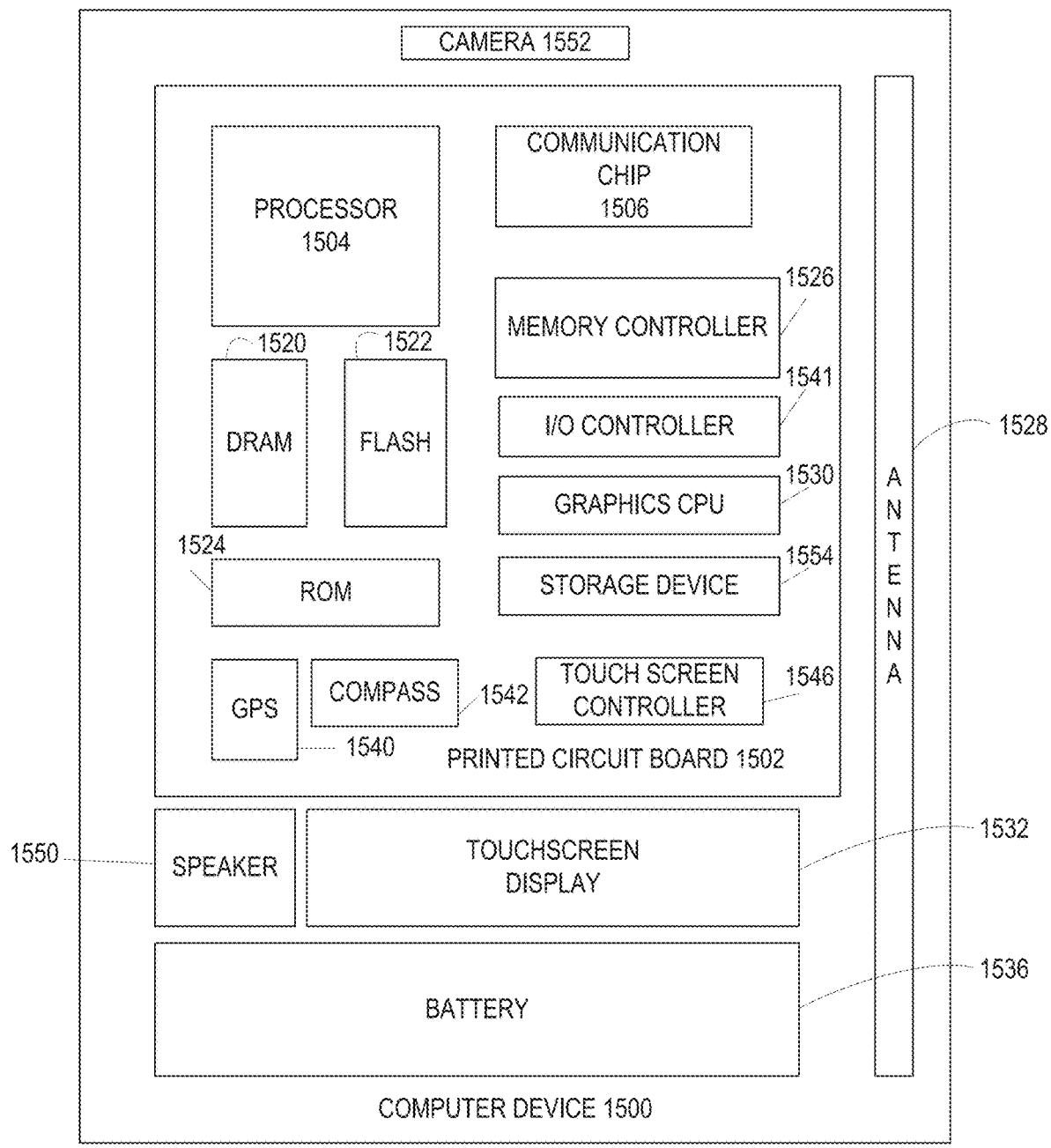
FIG. 5 is a block diagram of an example computer that can be used to implement some or all of the components of the disclosed systems and methods, according to various embodiments.

FIG. 5 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of system 100, process flow 200, method 300 and/or method 400 described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, headset, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) system 100, process flow 200, method 300 and/or method 400 described herein. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++, Objective-C, or the like, platforms and/or scripting environments such as React-Native, ClojureScript, NativeScript, or the like, and/or conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A computer-implemented method for selectively updating firmware in a dental operatory, comprising:

executing, by a remote server comprising a processor and memory, program code stored in the memory to update firmware of a plurality of dental devices and a gateway computing device at the dental operatory, wherein the remote server is remote from the gateway computing device and connected to the gateway computing device via a respective network, the gateway computing device is connected via a Controller Area Network (CAN) bus to the plurality of dental devices, and the updating comprises:

receiving, from the gateway computing device, via the respective network, firmware revision indications for the plurality of dental devices and a firmware revision indication of the gateway computing device;

using identifiers of the plurality of dental devices as lookups, accessing a database comprising an ordered list of a current firmware revision for the gateway computing device followed by current firmware revisions for the plurality of dental devices;

comparing the firmware revision indications for the plurality of dental devices received from the gateway computing device to the current firmware revisions in the ordered list to determine a subset of the plurality of dental devices that do not have a current firmware revision, wherein the subset comprises different types of dental devices;

comparing the firmware revision indication for the gateway computing device received from the gateway computing device to the current firmware revision for the gateway computing device in the ordered list to determine that the firmware of the gateway computing device is out of date;

based on the comparing the firmware revision indications for the plurality of dental devices, the comparing the firmware revision indication for the gateway computing device, and the ordered list, building an update package comprising a firmware update image for the gateway computing device and firmware update images for the subset of the plurality of dental devices; and transmitting the update package to the gateway computing device via the respective network, wherein the gateway processor is configured to:

extract the firmware update images from the update package to obtain extracted firmware update images, and to transmit, to each of the dental devices of the subset, via the CAN bus, a respective one of the extracted firmware update images that is written to a respective non-volatile memory of the dental device, and installing a respective extracted firmware update image by a respective microcontroller of the dental device; and extract the firmware update image for the gateway computing device from the update package to obtain an extracted firmware update image for the gateway computing device that is, written to a respective non-volatile memory of the gateway computing device and installing the extracted firmware update image for the gateway computing device by a respective microcontroller of the gateway computing device.

2. The computer-implemented method of claim 1, wherein the receiving the firmware revision indications for the plurality of dental devices further comprises:

querying, by the remote server, the gateway computing device, to determine if one or more specific types or models of dental devices are connected to the gateway computing device; and requesting, by the remote server, the firmware revision indications for each of the one or more specific types or models of dental devices that are provided by the gateway computing device in response to the query.

3. The computer-implemented method of claim 1, further comprising querying, by the remote server, each of the plurality of dental devices in the dental operatory to request the firmware revision indications for each of the plurality of dental devices.

4. The computer-implemented method of claim 3, wherein querying each of the plurality of dental devices in the dental operatory comprises transmitting a query to the gateway computing device.

5. The computer-implemented method of claim 1, wherein the different respective types of dental devices include an adjustable dental chair.

6. The computer-implemented method of claim 1, wherein the updating of the firmware of the plurality of dental devices and the gateway computing device occurs periodically on a scheduled basis and is initiated by the gateway computing device, the computer-implemented method further comprising:

in addition to the updating of the firmware of the plurality of dental devices and the gateway computing device on the scheduled basis, executing, by the remote server, program code to initiate a critical firmware update for at least one dental device of the plurality of dental devices, wherein the initiating the critical firmware update comprises:

determining that a critical firmware update is available for at least one of a specific type of dental device or a specific model of dental device;

querying the gateway computing device to determine whether a dental device corresponding to the at least one of the specific type of dental device or the specific model of dental device is among the plurality of dental devices; and if the querying indicates the corresponding dental device is among the plurality of dental devices, pushing the critical firmware update to the corresponding dental device via the gateway computing device.

7. The computer-implemented method of claim 6, wherein the querying of the gateway processor comprises determining whether a compressor is among the plurality of dental devices.

8. The computer-implemented method of claim 6, wherein the querying of the gateway processor comprises determining whether a particular model of dental chair is among the plurality of dental devices.

9. A non-transitory computer readable medium (NTCRM) for selectively updating firmware in a dental operatory, comprising instructions that, when executed by a gateway processor, cause the gateway processor to:

query different respective types of dental devices connected to the gateway processor via a Controller Area Network (CAN) bus to determine different respective firmware revisions of the different respective types of dental devices, wherein the different respective types of dental devices comprise different respective firmware formats, and the different respective firmware revisions include a respective firmware revision for the respective firmware of each of the different respective types of dental devices;

access a database comprising an ordered list of a current firmware revision for the gateway processor followed by current firmware revisions for the different respective types of dental devices, to determine, based on the different respective firmware revisions, a first subset of the different respective types of dental devices that do not have a current firmware revision and a second subset of the different respective types of dental devices that have a current firmware revision, and to determine that a firmware revision of the gateway processor is out of date;

transmit, to one or more remote servers, the firmware revision of the gateway processor and the firmware revisions for the first subset but not for the second subset;

receive, from the one or more remote servers, an update package that includes firmware update images for the gateway processor and for the first subset but not for the second subset;

extract the firmware update images from the update package to obtain extracted firmware update images for the first subset of the different respective types of dental devices and an extracted firmware update image for the gateway processor;

install the extracted firmware update image for the gateway processor at the gateway processor;

subsequent to the installing, transmit, to each of the different respective types of dental devices of the first subset, via the CAN bus, a respective one of the extracted firmware update images; and install the respective extracted firmware update images at the different respective types of dental devices of the first subset.

10. The NTCRM of claim 9, wherein the instructions are to further cause the gateway processor to transmit, to the one or more remote servers, an identifier for each of the different respective types of dental devices of the first subset.

11. The NTCRM of claim 9, wherein the instructions are to further cause the gateway processor to detect the different respective types of devices by querying the different respective types of devices via the CAN bus for their serial number.

12. The NTCRM of claim 9, wherein in addition to updating firmware, the instructions are to further cause the gateway processor to obtain data including at least one of performance metrics, diagnostics, system status, error codes or statistics from the different respective types of dental devices via the CAN bus and transmit the data to the one or more remote servers.

13. The NTCRM of claim 9, wherein:
the first subset of the different respective types of dental devices are provided by different manufacturers; and
the one or more remote servers comprise different remote servers of the different manufacturers.

14. The NTCRM of claim 9, wherein the different respective types of dental devices include an adjustable dental chair.

15. A dental operatory, comprising:
a plurality of pieces of dental equipment; and
a gateway processor in network communication with each of the plurality of pieces of dental equipment via a Controller Area Network (CAN) bus; and
a local storage of the gateway processor, wherein:
the gateway processor is adapted to:
store, in the local storage, a firmware revision indication of each of the plurality of pieces of dental equipment via the CAN bus and a firmware revision indication of the gateway processor;
transmit, to one or more remote servers, remote from the dental operatory, an identifier of the gateway processor and a firmware revision indication of the gateway processor, and identifiers of the plurality of pieces of dental equipment and firmware revision indications of the plurality of pieces of dental equipment;
wherein the one or more remote servers access a database comprising an ordered list of a current firmware revision for the gateway processor followed by current firmware revisions for the plurality of pieces of dental equipment, to determine that the firmware revision of the gateway processor is out of date, and to determine a first subset of the plurality of pieces of dental equipment that do not have a current firmware revision, and to build, based on the ordered list, an update package comprising a firmware update image for the gateway processor and firmware update images for the first subset of the plurality of pieces of dental equipment;
receive, from the one or more remote servers, the update package;
extract the firmware update images for the first subset from the update package to obtain extracted firmware update images for the first subset;
extract the firmware update image for the gateway processor from the update package to obtain an extracted firmware update image for the gateway processor;
install the extracted firmware update image for the gateway processor at the gateway processor;
subsequent to the installing, transmit, to each piece of dental equipment of the first subset, via the CAN bus, a respective one of the extracted firmware update images; and
install the respective one of the extracted firmware update images at each piece of dental equipment of the first subset.

16. The dental operatory of claim 15, wherein the transmitting of the identifier of the gateway processor and the firmware revision indication of the gateway processor and the identifiers of the plurality of pieces of dental equipment and the firmware revision indications of the plurality of pieces of dental equipment to the one or more remote servers is in response to receipt by the gateway processor of a query from the one or more remote servers.

17. The dental operatory of claim 15, wherein the gateway processor is adapted to detect the plurality of pieces of dental equipment connected to the network by querying the plurality of pieces of dental equipment via the CAN bus for at least one of their model number or serial number.

18. The dental operatory of claim 15, wherein the plurality of pieces of dental equipment comprise different types of dental equipment, and the different types of dental equipment include at least one of a dental unit, a vacuum pump, a compressor, an air purifier, a dental chair, a dental instrument or a dental light.

19. The dental operatory of claim 15, further comprising an additional piece of dental equipment which does not support a firmware update by the gateway processor and which is connected to the gateway processor via the CAN bus.

20. The dental operatory of claim 15, wherein the transmitting of the identifier of the gateway processor and the firmware revision indication of the gateway processor and the identifiers of the plurality of pieces of dental equipment and the firmware revision indications of the plurality of pieces of dental equipment to the one or more remote servers, is initiated by the gateway processor without receiving a query from the one or more remote servers.

* * * * *